(12) United States Patent
Kallas (10) Patent No.: US 7,174,669 B1
(45) Date of Patent: Feb. 13, 2007

(54) FISHING LURE WITH BAIT CAVITY (76) Inventor: Tom Kallas, 1444 N. Wenatchee Ave., Wenatchee, WA (US) 98801

( * ) Notice: Subject to any disclaimer, the term of this patent is extended or adjusted under 35 U.S.C. 154(b) by 0 days.

(21) Appl. No.: 11/151,505

(22) Filed: Jun. 13, 2005

(51) Int. Cl.
A01K 85/01 (2006.01)

(52) U.S. Cl. .................... 43/42.06; 43/42.36; 43/42.23

(58) Field of Classification Search .............. 43/42.06, 43/42.36, 42.22, 42.23, 42.49, 42.35, 41, 43/41.2
See application file for complete search history.

(56) References Cited

U.S. PATENT DOCUMENTS

| 422,226 | A | * | 2/1890 | Kestner | 43/41 |
| 810,017 | A | * | 1/1906 | Ackerman | 43/42.36 |
| 1,488,601 | A | * | 4/1924 | Jeffries | 43/41 |
| 1,608,375 | A | * | 11/1926 | Dewey | 43/42.23 |
| 1,913,362 | A | * | 6/1933 | Catarau | 43/42.06 |
| 2,004,308 | A | * | 6/1935 | Catarau | 43/42.06 |
| 2,008,004 | A | * | 7/1935 | Catarau | 43/42.06 |
| 2,205,472 | A | * | 6/1940 | Fagerholm | 43/41 |
| 2,215,772 | A | * | 9/1940 | Vecchia | 43/42.34 |
| 2,302,206 | A | * | 11/1942 | Gibson et al. | 43/41 |
| 2,484,747 | A | * | 10/1949 | Russell | 43/42.23 |
| 2,509,105 | A | * | 5/1950 | Meohas | 43/41 |
| 2,522,179 | A | * | 9/1950 | Jensen, Sr. et al. | 43/42.22 |
| 2,593,027 | A | * | 4/1952 | Heino | 43/42.06 |
| 2,639,536 | A | * | 5/1953 | Hartman et al. | 43/41 |
| 2,749,647 | A |   | 6/1956 | Beloff |  |
| 2,769,267 | A | * | 11/1956 | Ansley | 43/41 |
| 2,788,604 | A | * | 4/1957 | Sleight | 43/42.06 |
| 2,861,381 | A | * | 11/1958 | Snyder | 43/42.36 |
| 2,931,123 | A | * | 4/1960 | Jensen, Jr. | 43/41 |
| 2,937,467 | A | * | 5/1960 | Capps | 43/42.06 |
| 2,956,364 | A | * | 10/1960 | Kuckiewicz | 43/42.49 |
| 2,986,838 | A | * | 6/1961 | Smyser | 43/42.36 |
| 3,087,273 | A | * | 4/1963 | Nurme | 43/42.06 |
| 3,096,597 | A | * | 7/1963 | Dickinson | 43/42.36 |
| 3,190,028 | A | * | 6/1965 | Mambrin | 43/41.2 |
| 3,205,608 | A | * | 9/1965 | Dickinson | 43/42.23 |
| 3,230,658 | A | * | 1/1966 | Wuotila | 43/42.23 |
| 3,388,495 | A | * | 6/1968 | Minser | 43/42.23 |
| 3,680,249 | A | * | 8/1972 | Chiarenza | 43/42.06 |
| 3,685,191 | A | * | 8/1972 | Metzger | 43/42.23 |
| 3,688,430 | A | * | 9/1972 | Balch | 43/42.06 |
| 3,702,035 | A | * | 11/1972 | Pope | 43/42.35 |

(Continued)

FOREIGN PATENT DOCUMENTS

JP 2003-250388 A * 9/2003

(Continued)

Primary Examiner—Darren W. Ark
(74) Attorney, Agent, or Firm—Michael I. Kroll (57) ABSTRACT Apparatus 10 discloses a reusable, washable split cavity fishing lure having a "banana-like" shape that assembles and disassembles by means of snap counter parts 28 and surgical tubing 20. The lure 10 encompasses a hollow cavity 32 having a plurality of scent releasing apertures 26 producing a powerful scent trail that attracts game fish 12. The cavity 32 may be filled with bait 36 or scent pad 34. By adjusting the leader 16 position to one of a plurality of leader apertures 14 the lure 10 is designed to spin at various rates of speed. The present invention 10 also provides for an additional element in the form of posts 48 depending from the base of the lure to prevent hook 18, 22 from getting out of alignment.

8 Claims, 11 Drawing Sheets

U.S. PATENT DOCUMENTS

| | | | | |
|---|---|---|---|---|
| 3,748,772 A | * | 7/1973 | Gravitt | 43/41 |
| 3,805,436 A | * | 4/1974 | Davis | 43/42.35 |
| 3,834,058 A | * | 9/1974 | Gaunt | 43/42.49 |
| 3,879,881 A | * | 4/1975 | Vick | 43/41 |
| 3,913,257 A | * | 10/1975 | Colgan | 43/42.09 |
| 4,047,317 A | * | 9/1977 | Pfister | 43/42.06 |
| 4,134,224 A | * | 1/1979 | Clark | 43/42.36 |
| 4,205,476 A | | 6/1980 | Hsu | |
| 4,337,591 A | * | 7/1982 | Gell et al. | 43/42.22 |
| 4,442,622 A | * | 4/1984 | Sartain | 43/42.06 |
| 4,471,556 A | * | 9/1984 | Dworski | 43/42.23 |
| 4,553,348 A | * | 11/1985 | Cooper | 43/42.06 |
| 4,589,222 A | * | 5/1986 | Barnhart | 43/42.23 |
| 4,785,569 A | | 11/1988 | Thomas, Jr. | |
| 4,791,751 A | * | 12/1988 | Francklyn | 43/42.49 |
| 4,800,670 A | * | 1/1989 | Mattison | 43/42.06 |
| 4,888,907 A | * | 12/1989 | Gibbs | 43/42.06 |
| 5,036,617 A | | 8/1991 | Waldrip | |
| 5,505,016 A | | 4/1996 | Baron | |
| 5,617,669 A | | 4/1997 | Levey | |
| 5,829,186 A | | 11/1998 | Schultz et al. | |
| 5,862,623 A | * | 1/1999 | MacPherson | 43/42.06 |
| 6,158,161 A | * | 12/2000 | Rossman | 43/42.06 |
| 6,266,916 B1 | | 7/2001 | Dugan | |
| 6,588,138 B1 | * | 7/2003 | Gilbert | 43/42.06 |
| 6,904,712 B1 | * | 6/2005 | Gironda | 43/42.22 |
| 6,922,937 B1 | * | 8/2005 | Gilbert | 43/42.06 |
| 7,028,430 B2 | * | 4/2006 | Gironda | 43/42.22 |
| 2006/0053679 A1 | * | 3/2006 | Milanese | 43/42.36 |

FOREIGN PATENT DOCUMENTS

| | | |
|---|---|---|
| WO | WO02/094017 | 11/2002 |
| WO | WO02/100165 | 12/2002 |
| WO | WO03/101190 | 11/2003 |
| WO | WO-2005/077163 A1 * | 8/2005 |

* cited by examiner

FISHING LURE WITH BAIT CAVITY

BACKGROUND OF THE INVENTION

1. Field of the Invention

The present invention relates generally to fishing lures and, more specifically, to a reusable, washable split cavity fishing lure having a "banana-like" shape that assembles and disassembles by means of snap counter parts and surgical tubing.

The lure encompasses a hollow cavity having a plurality of scent releasing apertures producing a powerful scent trail that attracts game fish. The cavity may be filled with bait or scent pad. By adjusting the leader position to one of a plurality of leader apertures the lure is designed to spin at various rates of speed.

The present invention also provides for an additional element in the form of posts depending from the base of the lure to prevent hook from getting out of alignment.

2. Description of the Prior Art

There are other lures designed for holding bait. Typical of these is U.S. Pat. No. 2,749,647 issued to Beloff on Jun. 12, 1956.

Another patent was issued to Gravitt on Jul. 31, 1973 as U.S. Pat. No. 3,748,772. Yet another U.S. Pat. No. 4,047,317 was issued to Pfister on Sep. 13, 1977 and still yet another was issued on Jun. 3, 1980 to Hsu as U.S. Pat. No. 4,205,476.

Another patent was issued to Thomas, Jr. on Nov. 22, 1988 as U.S. Pat. No. 4,785,569. Yet another U.S. Pat. No. 4,791,751 was issued to Francklyn on Dec. 20, 1988. Another was issued to Waldrip on Aug. 6, 1991 as U.S. Pat. No. 5,036,617 and still yet another was issued on Apr. 9, 1996 to Baron as U.S. Pat. No. 5,505,016.

Another patent was issued to Levey on Apr. 8, 1997 as U.S. Pat. No. 5,617,669. Yet another U.S. Pat. No. 5,829,186 was issued to Schultz et al. on Nov. 3, 1998. Another was issued to MacPherson on Jan. 26, 1999 as U.S. Pat. No. 5,862,623 and still yet another was issued on Jul. 31, 2001 to Dugan as U.S. Pat. No. 6,266,916.

Another patent was issued to Gilbert on Jul. 8, 2003 as U.S. Pat. No. 6,588,138. Yet another International Patent Application No. WO02/094017 was issued to Siirtola on Nov. 28, 2002. Another was published to Holtzkampf on Dec. 19, 2002 as International Patent Application No. WO02/100165 and still yet another was published on Dec. 11, 2003 to Choi as International Patent Application No. WO03/101190.

U.S. Pat. No. 2,749,647

Inventor: Richard H. Beloff

Issued: Jun. 12, 1956

A chum lure for use as a lobster pot bait comprising an elongated lure body including a solid head portion, a solid tail portion shaped to simulate the tail of a fish and an elongated hollow body portion extending between the head portion and tail portion and defining a cavity having a rear end closed by the tail portion and an open forward end, said hollow body portion being provided with a plurality of perforations opening into said cavity and outwardly thereof, latch means retaining said head portion in a position to close the open forward end of the cavity and releasable for movement of the head portion to a position for exposing said open end of the cavity, and a finely divided chum material contained within the cavity and applied thereto through the open forward end thereof, said chum material being dispensed through the perforations of the hollow body portion from said lure body for attracting lobsters to the lure by taste and smell, said head portion containing configurations simulating the eyes, nose and mouth of a natural bait fish, said body portion having an appendage simulating a fish fin, said lure body being colored to cooperate with the shape, configurations and appendage thereof to realistically simulate a natural bait fish for visually attracting lobsters and providing an enclosure by which lobsters are denied access to the chum material while contained in the cavity.

U.S. Pat. No. 3,748,772

Inventor: Elmer W. Gravitt

Issued: Jul. 31, 1973

First and second transparent housing members are pivotally secured together at one end by a U-shaped element to form a hollow minnow compartment. The upper one of the housing members is provided with an air compartment and each of the members are formed with water passages. A fishhook is connected to the U-shaped pivot element and to the bottom one of the members. The end of the members opposite to the pivoted end are held by a snap fastener connected to a leader.

U.S. Pat. No. 4,047,317

Inventor: William H. Pfister

Issued: Sep. 13, 1977

A fish lure having a hollow body portion formed of complimentary shells pivotally secured together at one end is provided with a fish attracting scent material carried within the lure body. Openings in the lure body are provided at each end to permit water to enter and leave the lure cavity as the lure is pulled through the water, thereby dispersing the scent. A latch cooperating with a hook securing means permits easy access to the lure cavity while holding the shells together while fishing.

U.S. Pat. No. 4,205,476

Inventor: Yun T. Hsu

Issued: Jun. 3, 1980

The present invention provides fishing with a novel design of bait in the shape similar to small fish, shrimp, cuttle or other insects, wherein the foodstuff for inducing fish can be set and whereon there are a number of orifices, through which the said foodstuff can smell outward so as to induce the fish to bite.

U.S. Pat. No. 4,785,569

Inventor: Cecil T. Thomas, Jr.

Issued: Nov. 22, 1988

A fishing lure with an improved lure retaining device is provided for securely fastening a pliable-type lure body to a fishing hook after the lure body is pressed over the hook. A rigid pin member having a stop at one end is pushed through the lure body and through the eye of the hook. An attachable and detachable retainer is connected to the other end of the rigid pin member, thereby preventing the pin from falling out of the hook eye, and also preventing the lure body from moving along the shank of the hook. The retaining device may have a water-tight interior cavity to provide a desired buoyancy for the lure, and to accommodate a plurality of ball members sealed within the cavity which create noise and thereby attract fish as the lure is pulled through the water.

U.S. Pat. No. 4,791,751

Inventor: Gilbert W. Francklyn

Issued: Dec. 20, 1988

An adjustable bait-receiving fishing lure is disclosed for use in receiving baits of varying size and producing differing lure retrieval patterns. The bait-receiving lure includes a top section and bottom section that cooperatively engage the upper and lower forward portions of a bait. A diving lip controls the depth at which the lure is retrieved and provides a swimming action. A screw, passing through disc-like portions of the top piece, bottom piece, and diving lip allows the relative orientation of these components to be adjustably secured. In this manner, baits of varying size can be accommodated between the top and bottom sections, while the diving lip is adjusted to produce a desired lure retrieval pattern for the particular size of herring and trolling speed involved. To adjust the lure's action, the line is attached to the diving lip by a removable and rotatable, frictionally secured plug. By changing the orientation of the plug with respect to the diving lip, the point of connection between the line and lure varies, allowing the lure to traverse a helical pattern underneath the surface of the water.

U.S. Pat. No. 5,036,617

Inventor: Ralph Leland Waldrip

Issued: Aug. 6, 1991

A fishing lure has a hollow body and a closable end cap which can be snapped open or shut, or screwed on or off in order to insert live bait or cut bait into the hollow body. A variety of inserts receivable in the hollow body instead of live bait or cut bait include a hollow insert having a colored, textured outer surface which resembles live bait. The colored, textured surface of the hollow surface is visible from outside of the hollow body since the hollow body is made of clear plastic material. Other inserts include a noise-making insert which is receivable in the hollow insert and a filler insert which is receivable in the hollow insert instead of the noise-making insert. The hollow body may be made in a variety of shapes and sizes depending on the type of gamefish to be fished. The inserts are likewise variable in size and shape but are substantially of a shape to conform to inner surfaces of the hollow body and end cap.

U.S. Pat. No. 5,505,016

Inventor: Richard D. Baron

Issued: Apr. 9, 1996

An enhanced fishing lure is disclosed for attaching a bait to a fishing line, comprising a lure head having a front aperture for enabling the fishing line to extend therethrough. The lure head has an insert cavity communicating with the front aperture. A lure insert comprises an insert portion with a first and a second panel extending from the lure head and the lure insert, respectively. At least one locking pin is secured to one of the first and second panels for cooperating with at least one locking aperture defined in the other of the first and second panels. The locking pin extends through the bait for restraining the movement of the bait relative thereto. The lure insert is insertable within the insert cavity of the lure head with the fishing line extending through the front aperture of the lure head and with the locking aperture cooperating with the locking pin for interlocking the lure insert to the lure head. A restrainer includes a line aperture defined in the lure insert for restraining the movement of the fishing line relative thereto and for maintaining the lure insert on the fishing line in the event the lure insert is separated from the lure head.

U.S. Pat. No. 5,617,669

Inventor: Stewart Levey

Issued: Apr. 8, 1997

The container comprises a pair of longitudinally divided cylinder halves molded unitarily with a connecting "living hinge" running the entire length of the container. Mating fasteners are provided on the ends of the halves opposite the hinge. Weight-receiving pockets are molded integrally with the ends of the lower half.

U.S. Pat. No. 5,829,186

Inventor: Benjamin I. Schultz, et al.

Issued: Nov. 3, 1998

A fishing lure for securing bait includes an elongated upper jaw having a front end and a rear end; an elongated lower jaw having a front end and a rear end and a lower surface; a pivotal connection hinge between the front end of the upper jaw and the front end of the lower jaw; a first row of teeth on an interior surface of the upper jaw; a second row of teeth affixed to an interior surface of the lower jaw, the first row of teeth facing the second row of teeth, wherein bait fish are secured between the first row of teeth and the second row of teeth; a hook connected to the rear end of the lower jaw; and a buoyant element secured to the upper jaw front end to elevate the front end relative to the rear end. The fishing lure preferably additionally includes a keel extending longitudinally along and protruding outwardly from the lower jaw for minimizing lateral drifting of the lure. The fishing lure preferably additionally includes a top half wall attached to the upper jaw forward of the first row of teeth; and a bottom half wall attached to the lower jaw forward of the second row of teeth, where closing the upper jaw to the lower jaw enables the top half wall to cause a closure against the bottom half wall for keeping water from washing the bait out.

U.S. Pat. No. 5,862,623

Inventor: Gerald M. MacPherson

Issued: Jan. 26, 1999

The substitute component is made of two mating layers of VELCRO™ material shaped in platform to resemble the body of a bait fish. The component can be manipulated during or after assembly to curve it to cause it to simulate the motions of an injured fish as it moves through water. The layers can be impregnated with material which provides fish attracting odors.

U.S. Pat. No. 6,266,916

Inventor: Randal Scot Dugan

Issued: Jul. 31, 2001

A fishing lure molded of flexible, translucent, soft plastic material into an integral unit in the form of a baitfish. Pigments, glitter, scent and flavor additives are mixed with the plastic during manufacture to create realistic visual, smell and taste characteristics. A wide gap offset fish hook is removably attached and substantially hidden in the lure by a hook slot in the lower longitudinal edge of the lure, and by an internal chamber. The internal chamber further serves to allow the body of the lure to collapse when attacked by a fish, exposing the point of the hook, as well as to conceal tube weights, flotation inserts, trap air contributing to the buoyancy and upright positioning of the lure, and to act as a reservoir for liquid fish attractant. The buoyancy and sink rate of the lure can be manipulated by utilizing various combinations of hook sizes, tube weight sizes, and flotation inserts positions into the internal chamber. Realistic movement of the lure is attained through the buoyancy and flexibility of the plastic material, the hydrodynamics of the design, and through rod, reel and fishing line manipulation by the angler.

U.S. Pat. No. 6,588,138

Inventor: Mitchel A. Gilbert

Issued: Jul. 8, 2003

A fishing lure consisting of an arched hollow body with an interior bait chamber is provided. The interior chamber is divided into a buoyancy chamber and a bait chamber. A number of small openings are formed in the outer body to enable scent and bait particles to be broadcast from bait stored within the bait chamber as the lure is passed through the water. Access to the bait chamber is further provided by either a hinged cover or by a hinged connection formed in the lure body between the buoyancy chamber and the bait chamber. Access to the bait chamber is restricted while the lure is being passed through the water as a result of the water flow positioning either the cover or the hinged lure body over the opening to the bait chamber. Once removed from the water, access to the bait chamber is readily obtained through movement of either the cover or the hinged lure body for re-supplying bait prior to supplemental use of the lure.

International Patent Application Number
WO02/094017

Inventor: Juhn Siirtola

Published: Nov. 28, 2002

The present invention provides for a lure and a method of making a lure that has a metal coating or layer on the interior surface of the lure body. The coating is visible from the exterior of the lure but protected from damage by the lure body.

International Patent Application Number
WO02/100165

Inventor: Francis A. Holtzkampf

Published: Dec. 19, 2002

A fishing accessory is provided which includes a body defining a longitudinal passage in which a fishing line is receivable, and defining a slot extending laterally from the passage to an outside of the body. A resilient helical element is axially receivable within the passage with an interference fit, and extends helically from a rear end of the body to engage a fishing lure, disposed on a fishing hook. The accessory is secured on the fishing line by passing the fishing line through the slot into the passage, winding the fishing line through adjacent coils of the helical element, sliding the helical element into the passage, and securing a rear end of the helical element to the lure. A locking member may also be inserted into the passage. The fishing accessory may be installed on the fishing line without having to untie the fishing line from the fishing hook.

International Patent Application Number
WO03/101190

Inventor: Eric Choi

Published: Dec. 11, 2003

A fishing lure is formed in such a way that substantially whole part of a core member formed of a hard material is covered with a surface member formed of a soft material. Any one of metal, wood and hard synthetic resin is adopted as the hard material, and soft synthetic resin is adopted as the soft material. The lure is produced by a one-piece injection molding method in which the soft synthetic resin is injected into a cavity of a predetermined mold with the core member being loaded in the cavity.

While these lures may be suitable for the purposes for which they were designed, they would not be as suitable for the purposes of the present invention, as hereinafter described.

SUMMARY OF THE PRESENT INVENTION

The present invention discloses a reusable, washable split cavity fishing lure having a "banana-like" shape that assembles and disassembles by means of snap counter parts and surgical tubing. The lure encompasses a hollow cavity having a plurality of scent releasing apertures producing a powerful scent trail that attracts game fish. The cavity may be filled with bait or scent pad. By adjusting the leader position to one of a plurality of leader apertures the lure is designed to spin at various rates of speed. The present invention also provides for an additional element in the form of posts depending from the base of the lure to prevent hook from getting out of alignment.

A primary object of the present invention is to provide a reusable, washable split cavity fishing lure.

Another object of the present invention is to provide a fishing lure having that assembles and disassembles by means of snap counter parts and surgical tubing.

Yet another object of the present invention is to provide a fishing lure that encompasses a hollow cavity having a plurality of scent releasing apertures within the body.

Still yet another object of the present invention is to provide a fishing lure wherein said apertures produce a powerful scent trail that attracts game fish.

Another object of the present invention is to provide a fishing lure that may be filled with bait or scent pad.

Yet another object of the present invention is to provide a fishing lure that by adjusting the leader position to one of a plurality of leader apertures the lure will spin at various rates of speed.

Still yet another object of the present invention is to provide means for keeping hook leader lines from getting out of alignment by providing posts depending from the base positioned on opposing sides of the leader apertures.

Additional objects of the present invention will appear as the description proceeds.

The present invention overcomes the shortcomings of the prior art by providing a reusable, washable split cavity fishing lure having a "banana-like" shape that assembles and disassembles by means of snap counter parts and surgical tubing.

The lure encompasses a hollow cavity having a plurality of scent releasing apertures producing a powerful scent trail that attracts game fish. The cavity may be filled with bait or scent pad. By adjusting the leader position to one of a plurality of leader apertures the lure is designed to spin at various rates of speed.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
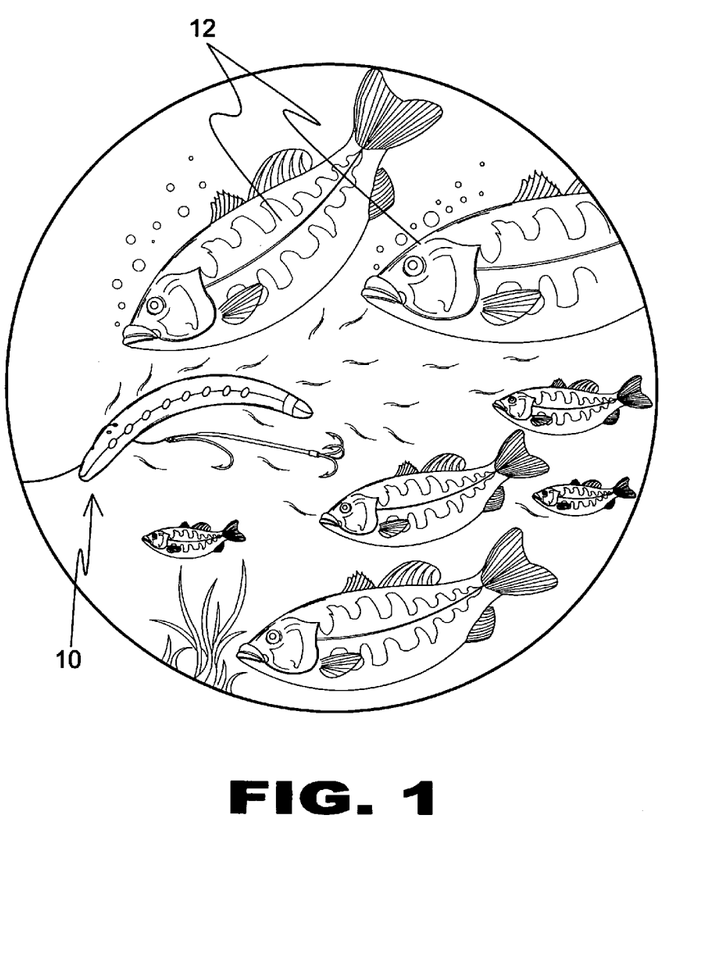
FIG. 1 is an illustrative view of the present invention in use.

Turning to FIG. 1, shown therein is an illustrative view of the present invention 10 in use. The present invention 10 discloses a reusable, washable split cavity fishing lure having a "banana"-shaped body that assembles and disassembles by means of snap counter parts and surgical tubing. The lure 10 comprises a hollow cavity having a plurality of scent releasing apertures. The lure 10 is designed to spin at various rates of speed by adjusting the leader position to one of a plurality of leader apertures. The device 10 produces a powerful scent trail that attracts game fish 12. The hollow cavity may be filled with bait or scent pad.

Figure 2:
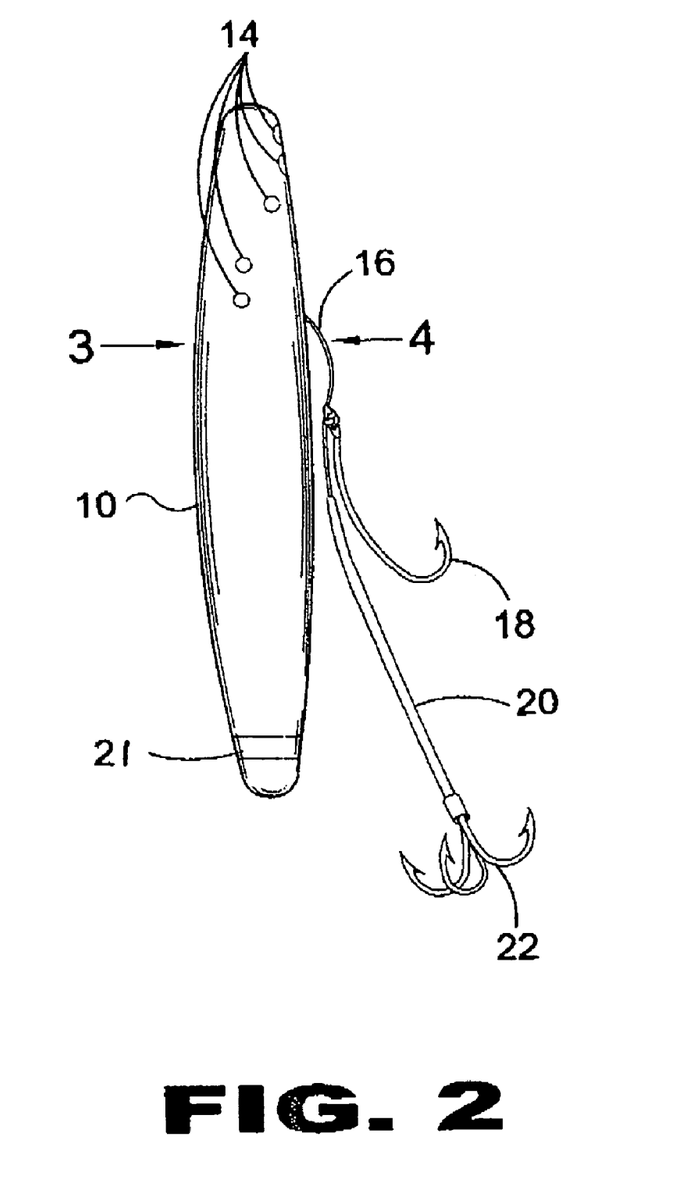
FIG. 2 is a top view of the present invention.

Turning to FIG. 2, shown therein is a top view of the present invention 10. Shown is atop view of the present invention 10 to orient positioning. The device 10 discloses a reusable, washable split cavity fishing lure having a "banana"-shaped body that assembles and disassembles by means of snap counter parts. The lure comprises a hollow cavity having a plurality of scent releasing apertures. The lure is designed to spin at various rates of speed by adjusting the leader position to one of a plurality of leader apertures 14 disposed generally in the front one-third of the body extending from the rear aperture near the crown of the top half to a point where the front most aperture is near the side of the top half of the body. The device 10 produces a powerful scent trail that attracts game fish. The hollow cavity may be filled with bait or scent pad. Also shown are leader 16, hook 18, surgical tubing, band 21 made of elastomeric material and treble hook 22.

Figure 3:
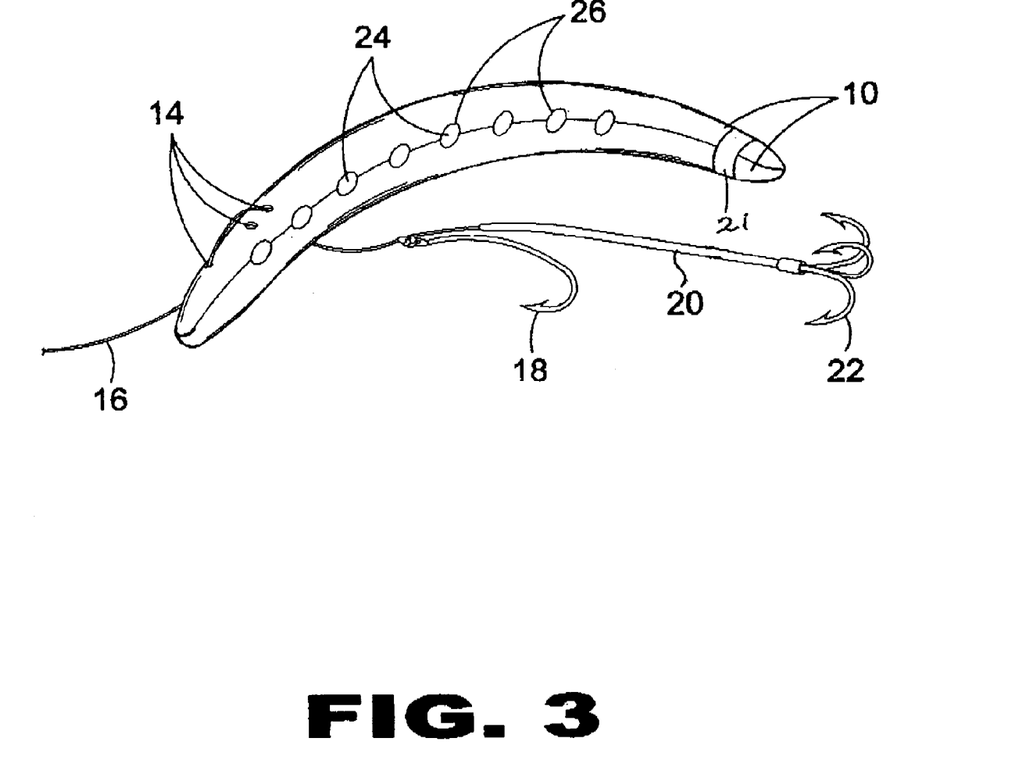
FIG. 3 is a perspective view of the present invention assembled.
Figure 4:
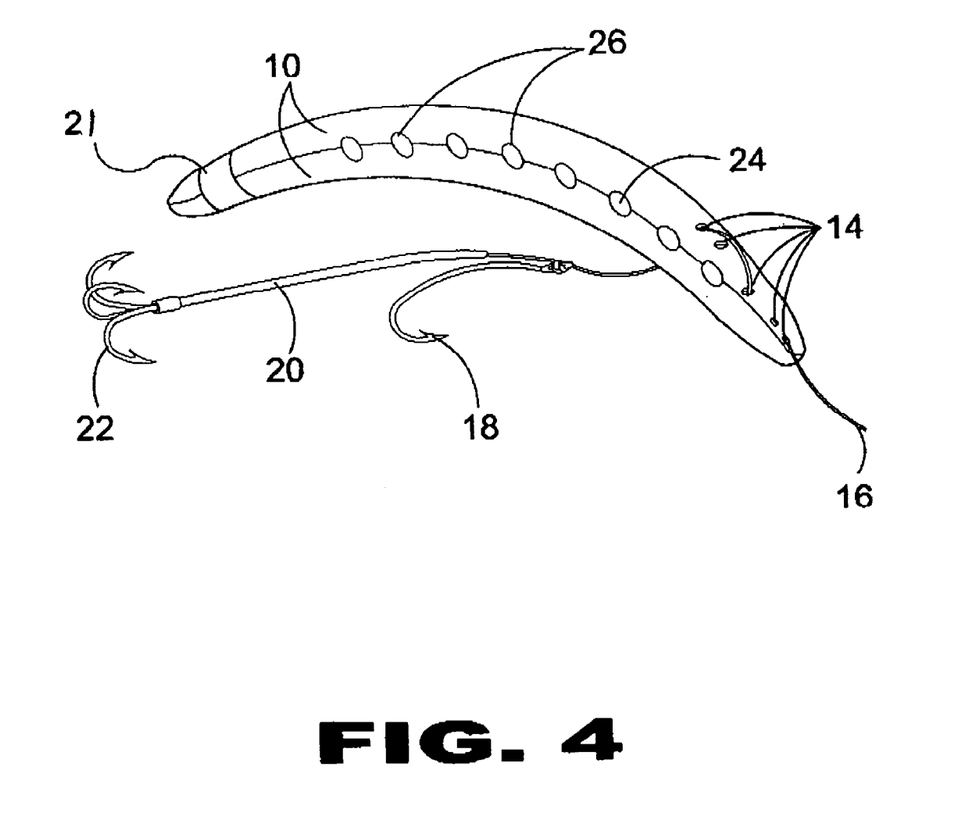
FIG. 4 is a perspective view of the present invention assembled.

Turning to FIG. 3, shown therein is a perspective view of the present invention 10 assembled. Shown is a perspective view of the present invention 10. The split cavity prerigged lure makes using bait easy. The user simply cuts the bait into small pieces and places the bait within the bait cavity. An advantage is having the bait inside a cavity to prevent the fish from stealing the bait without getting hooked. Also shown are scent pad 24, scent release apertures 26 and other previously disclosed elements Turning to FIG. 4, shown therein is a perspective view of the present invention assembled 10. A unique part of this lure is that the user can adjust the speed of the lure spin and it's action by repositioning the leader 16 through a different leader exit hole 14 in the head. When the leader 16 is threaded through the lure top hole position, the leader angle to the lure body is greater. Producing a greater action designed for slow trolling or mooching speeds. The hole 14 closest to the top of the head has a leader 16 whose angle is significantly reduced producing a tighter rolling action for increased trolling speeds. Other previously disclosed elements are also shown.

Figure 5:
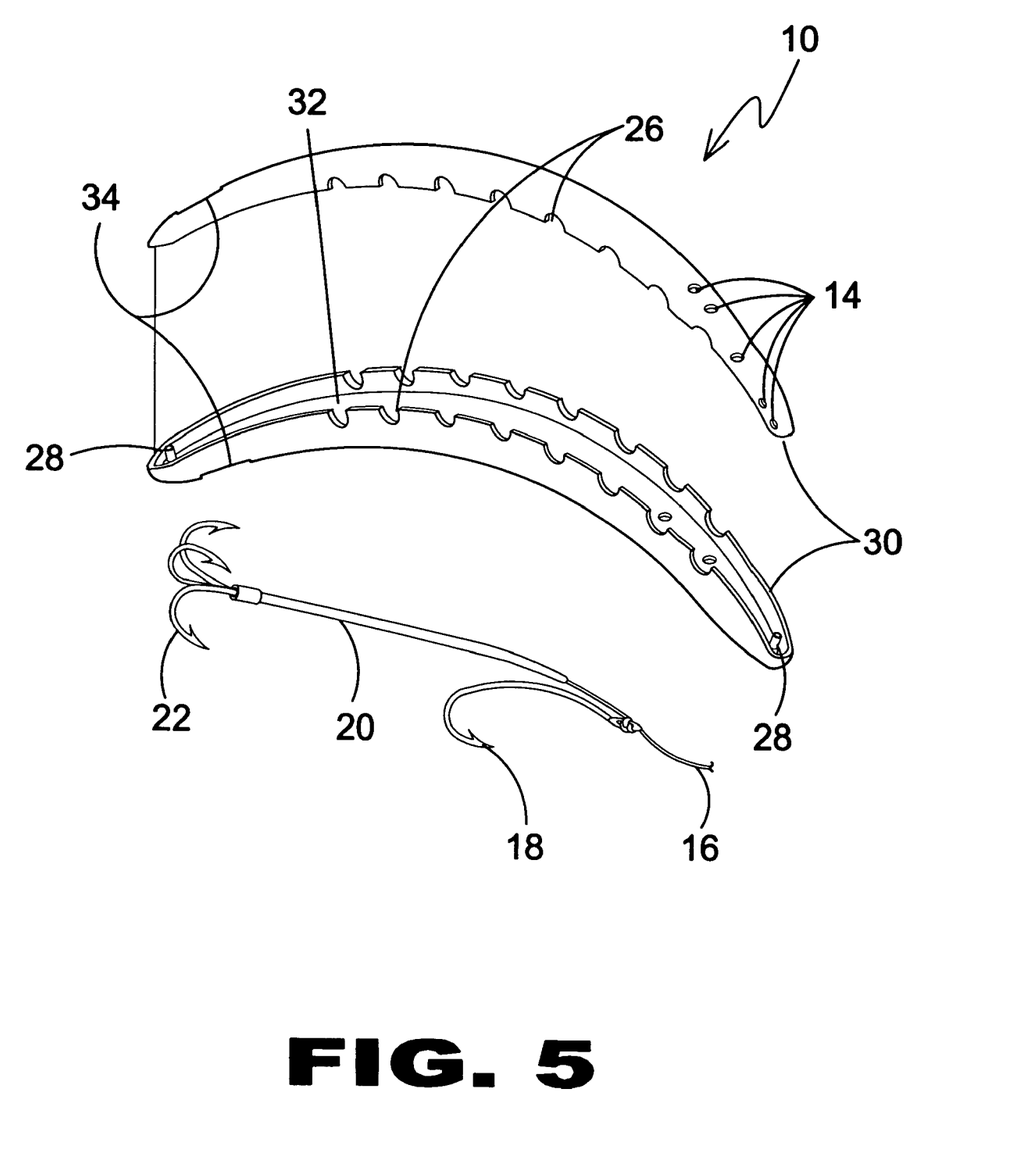
FIG. 5 is a perspective view of the present invention disassembled.

Turning to FIG. 5, shown therein is a perspective view of the present invention 10 disassembled. Shown is a perspective view of the present invention 10. The device 10 discloses a reusable, washable split cavity fishing lure having two mating parts 30 with a cavity 32 having a "banana" shaped body that assembles and disassembles by means of multiple snap 28 counter parts The lure 10 comprises a hollow cavity 32 having a plurality of scent releasing apertures 26. The lure 10 is designed to spin at various rates of speed by adjusting the leader position to one of a plurality of leader apertures 14. The device 10 produces a powerful scent trail that attracts game fish. The hollow cavity 32 may be filled with bait or scent pad. Also shown is a recess 34 for receiving band 21 along with other previously disclosed elements.

Figure 6:
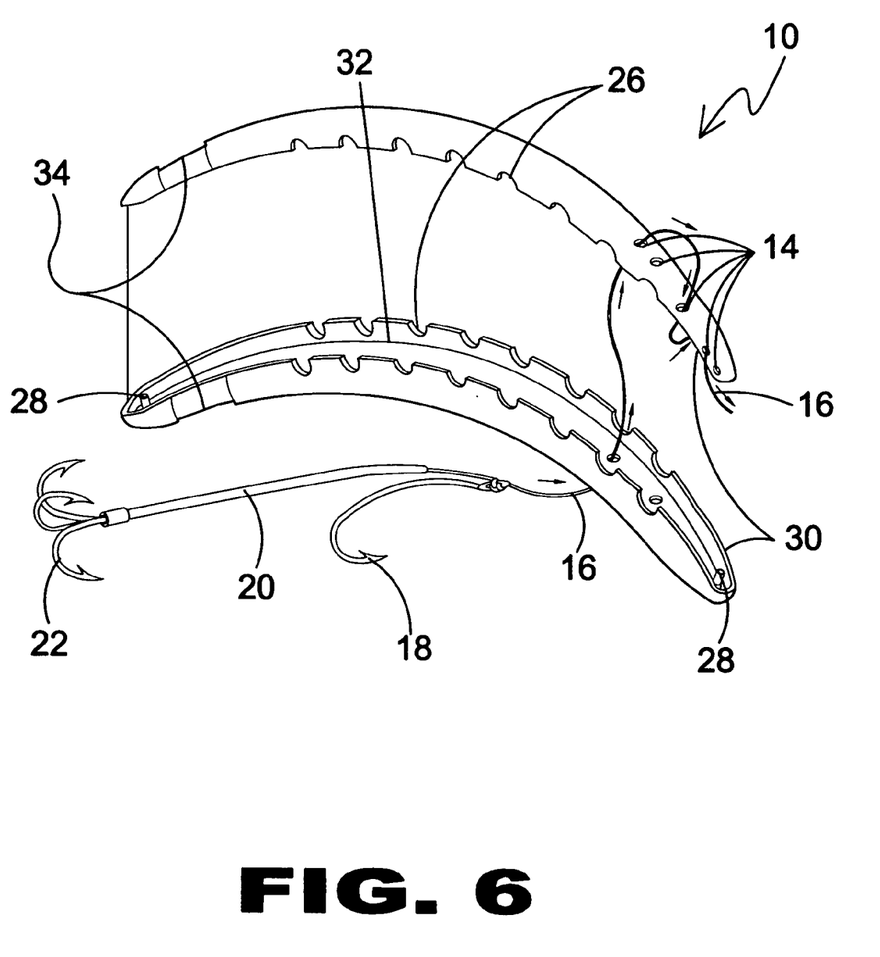
FIG. 6 is a perspective view of the present invention disassembled.

Turning to FIG. 6, shown therein is a perspective view of the present invention 10 disassembled. Shown is a perspective view of the present invention 10. The leader 16 is threaded through both parts 30 to stabilize the bait and the cavity 32. The hooks 18, 22 are generally snugged up to the underside of the bait cavity to produce a faster spinning action. If the user wants to slow the action down further, the hooks 18, 22 can be slid back several inches. Other previously disclosed elements are also shown.

Figure 7:
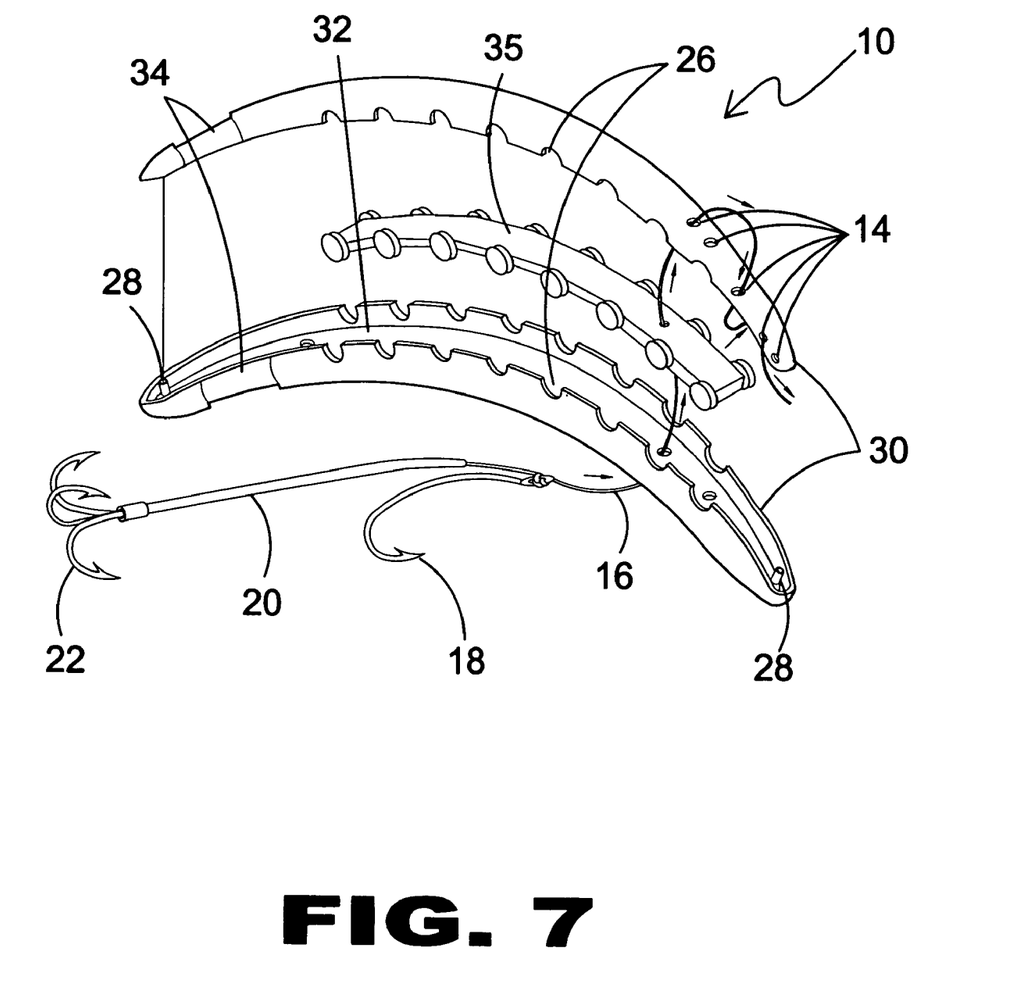
FIG. 7 is a perspective view of the present invention disassembled.

Turning to FIG. 7, shown therein is a perspective view of the present invention 10 disassembled. Another unique feature to the split cavity lure is the ability to add a molded insert 35 into the cavity 32 of the bait to hold scent instead of bait chunks. The foam or other absorbent material 35 will increase the amount of scent for longer lasting use. Other previously disclosed elements are also shown.

Figure 8:
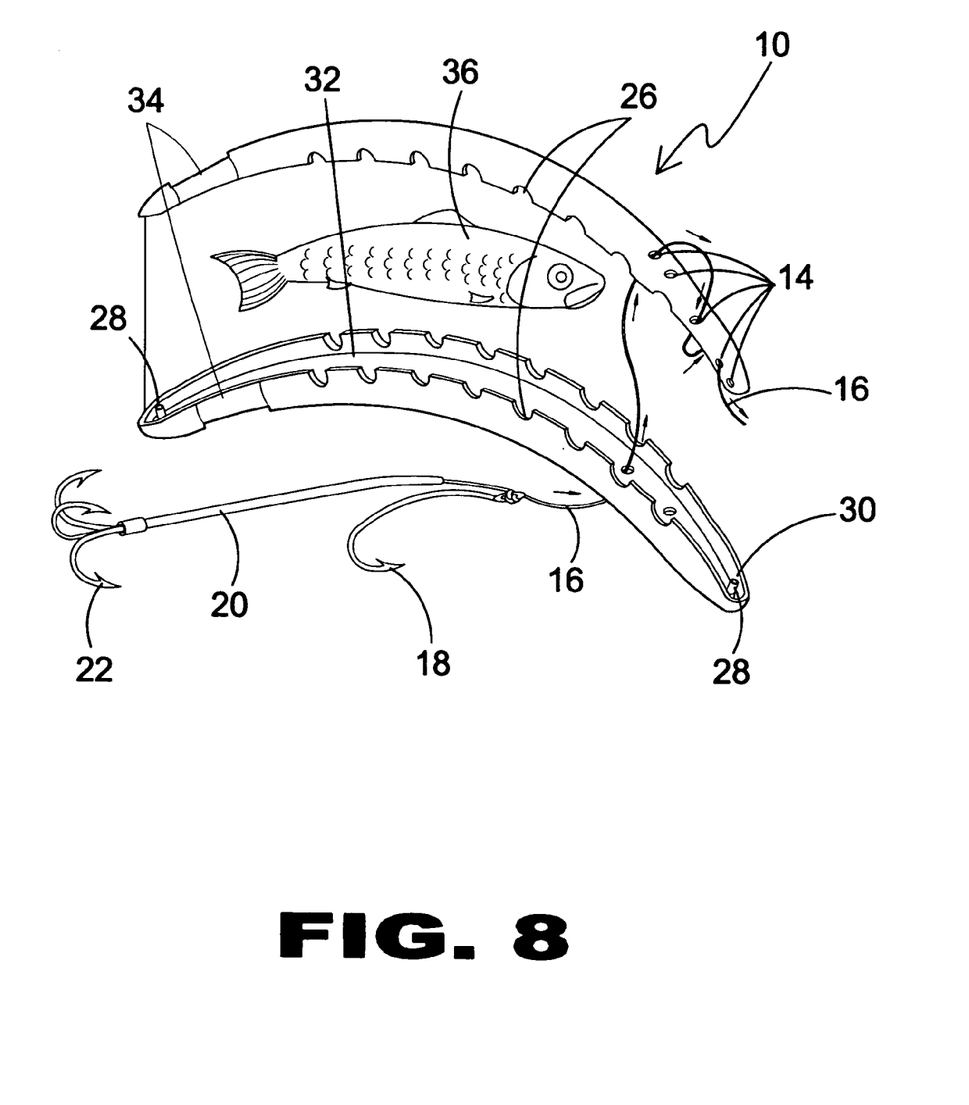
FIG. 8 is a perspective view of the present invention disassembled.

Turning to FIG. 8, shown therein is a perspective view of the present invention 10 disassembled. Another unique feature to the split cavity lure is the way the holes 26 are formed for emitting the scent out of the bait. Half of each hole 26 is positioned on each bait half 30 in such a way that they line up to match and form a series of holes that are spaced apart from the head of the lure to the tail. The holes 26 are big to allow the sent to travel quickly out of the bait cavity 32. Also shown is a scented bait 36 along with other previously disclosed elements.

Figure 9:
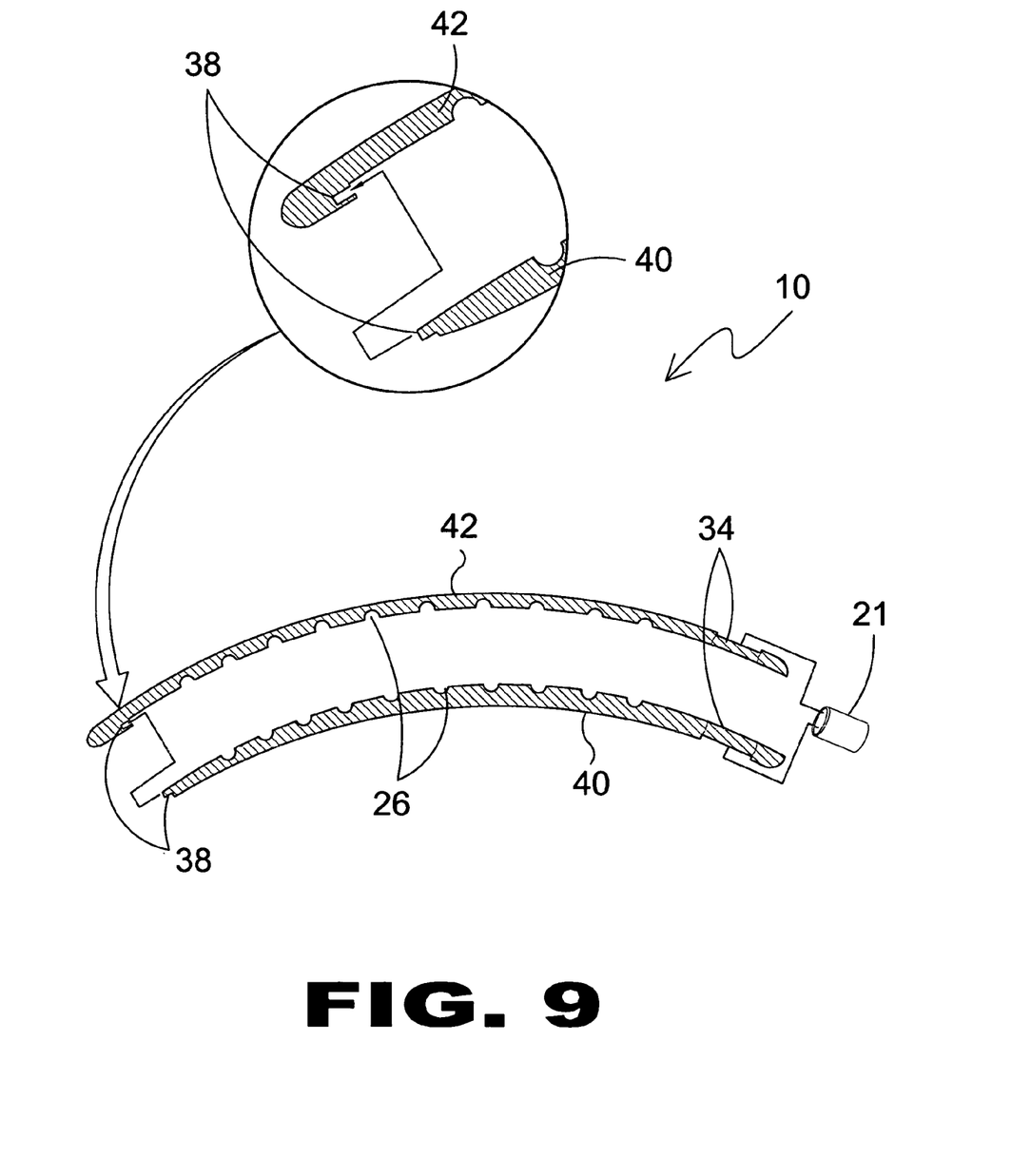
FIG. 9 is a perspective view of an alternate body connection of the present invention.

Turning to FIG. 9, shown therein is a perspective view of an alternate body connection of the present invention 10. An alternate connection feature to the split cavity lure is a mating clip in connection 38, whereby the bottom cavity 10 comprises an insert member that engages a counter part in the top cavity 42. An additional securing member comprising a band 21 is also provided at the rear portion of the lure. Other previously disclosed elements are also shown.

Figure 10:
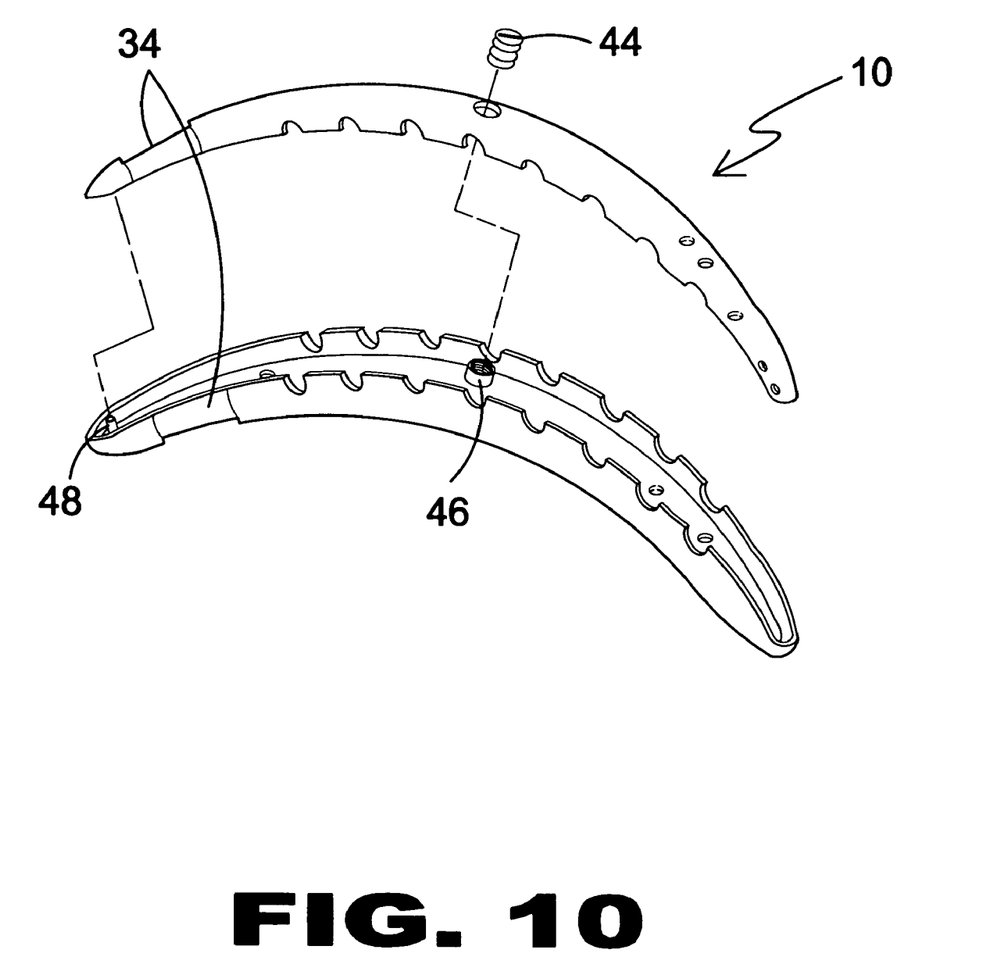
FIG. 10 is a perspective view of an alternate body connection of the present invention.

Turning to FIG. 10, shown therein is a perspective view of an alternate body connection of the present invention 10. An alternate connection feature to the split cavity lure is a set screw connection, whereby a set screw 44 is inserted into and through the top part and engaging a threaded member 46 in the bottom part. An additional securing member 20 (shown in FIG. 11) comprising a band 21 in recess/cavity 34 is also provided at the rear portion of the lure along with alignment member 48.

Figure 11:
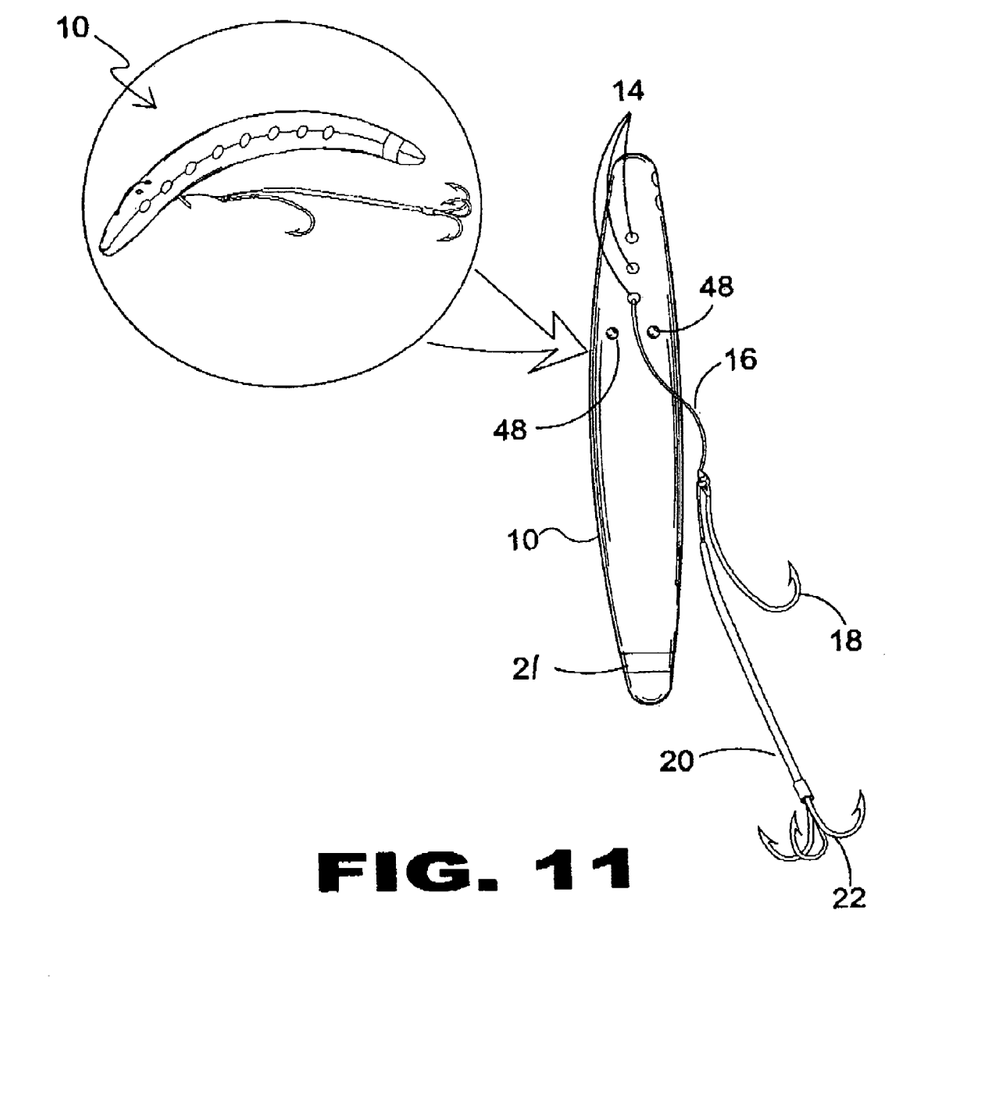
FIG. 11 is a bottom view of the present invention.

Turning to FIG. 11, shown therein is a bottom view of the present invention 10. Shown is a bottom view of the present invention 10 having an additional element in the form of posts 48 depending from the base that will prevent hooks 18, 22 from getting out of alignment. Other previously disclosed elements are also shown.

I claim:

1. An apparatus for a fishing lure in combination with a leader, comprising:
   a) a body, said body being banana-shaped in length with a concave portion and having front and rear ends, first and second sides, first upper and second lower portions each having upper and lower surfaces, said first and second portions being joined together to form said banana-shaped body having a cavity therein, said cavity containing a scented material or bait, wherein said body travels through the water with the concave portion of said banana-shaped body being disposed downwardly, wherein said first and second sides have a plurality of scent apertures therein, wherein said front ends of said first upper and second lower portions have a plurality of leader apertures therein;
   b) wherein said scent apertures are disposed in a spaced apart relationship along each of said first and second sides of said body from said front end to said rear end to permit water to pass through the scent apertures to distribute the scent of a material or particles of bait into the surrounding water to attract fish;
   c) wherein said leader apertures are disposed in a spaced apart relationship along each of said first upper and second lower portions, to permit movement of the body to be varied in the water by placement of a leader in different leader apertures, wherein said leader apertures are disposed in about a front one-third of the length of said body; and
   d) wherein said leader passes first into said body through a leader aperture on said first upper portion of said body closest to the front end of said body, through said cavity and out through another leader aperture in said first upper portion further from said front end, back into said cavity through another leader aperture still further away from said front end of said body, then through a leader aperture on said second lower portion of said body, wherein a distal end of the leader is then connected to a treble fish hook after passing through surgical tubing, a single hook attached to said leader between an end of said surgical tubing and said second lower portion, said treble fish hook and said single hook depending from said lower surface of said second lower portion of said body to permit a fish to be hooked by the fishing lure being pulled through water.

2. The combination of claim 1, wherein one-half of each of said scent apertures is disposed on each of said first upper and second lower portions of said body so that said apertures are formed when said upper and lower portions of said body are joined together.

3. The combination of claim 2, further comprising means for job said first upper and second lower portions of said body together whereby the upper and lower portions are releasably joined together.

4. The combination of claim 3, wherein said means for joining comprises multiple snap counter parts.

5. The combination of claim 3, wherein said means for joining includes a circular member made of elastomeric material surrounding said body adjacent one end of said body.

6. The combination of claim 3, wherein said means for joining comprises a set screw beg disposed on said first upper portion of said body and a mating female threaded member for receiving said set screw being disposed on said second lower portion of said body.

7. The combination of claim 3, wherein said means for joining comprises:
   a) wherein said lower surface of said rear end of said first upper portion of said body has a recess therein, said recess being disposed so that an opening thereof faces faced toward said front end of said body;
   b) a clip-in connector being disposed on said rear end of said second lower portion of said body; and,
   c) wherein said clip-in connector is inserted into said opening of said recess so that said first upper and second lower portions are releasably joined together.

8. The combination of claim 3, further comprising first and second downwardly extending posts being disposed on said lower surface of said lower portion of said body, wherein said first post is disposed on one side of said leader apertures and said second post is disposed on the opposite side of said leader apertures so that the leader is captured between said posts when the apparatus is pulled through the water.

* * * * *